(12) United States Patent
Desjoyaux et al.

(10) Patent No.: US 6,503,391 B2
(45) Date of Patent: Jan. 7, 2003

(54) SYSTEM OF PIPEWORK FOR A DEVICE FOR FILTERING AND PUMPING THE WATER OF A SWIMMING POOL BASING

(75) Inventors: Jean Louis Desjoyaux, L'Etrat (FR); Pierre Louis Desjoyaux, La Fouillouse (FR); Catherine Jandros, L'Etrat (FR)

(73) Assignee: Piscines Desjoyaux S.A., La Fouillouse (FR)

( * ) Notice: Subject to any disclaimer, the term of this patent is extended or adjusted under 35 U.S.C. 154(b) by 0 days.

(21) Appl. No.: 10/001,425

(22) Filed: Nov. 1, 2001

(65) Prior Publication Data
US 2002/0040869 A1 Apr. 11, 2002

Related U.S. Application Data

(63) Continuation of application No. PCT/FR00/02641, filed on Sep. 25, 2000.

(30) Foreign Application Priority Data

Oct. 11, 1999 (FR) .............................. 99.12856

(51) Int. Cl.$^7$ .............................. E04H 4/16; E04H 4/12
(52) U.S. Cl. .................... 210/169; 210/416.2; 4/507; 138/157; 138/162
(58) Field of Search .................... 210/169, 416.2, 210/416.1; 4/507; 138/156, 157, 162, 166

(56) References Cited

U.S. PATENT DOCUMENTS

| | | | |
|---|---|---|---|
| 165,302 A | * | 7/1875 | Butler |
| 3,220,553 A | | 11/1965 | Growall et al. |
| 4,967,799 A | * | 11/1990 | Bradshaw et al. |
| 5,202,020 A | * | 4/1993 | Desjoyaux et al. |
| 5,879,547 A | | 3/1999 | Desjoyaux et al. ......... 210/169 |
| 6,138,294 A | * | 10/2000 | Desjoyaux et al. |
| 6,247,500 B1 | * | 6/2001 | McMahon |

FOREIGN PATENT DOCUMENTS

WO    WO 96/12075    4/1996

\* cited by examiner

*Primary Examiner*—David Simmons
*Assistant Examiner*—Fred Prince
(74) *Attorney, Agent, or Firm*—Heslin Rothenberg Farley & Mesiti P.C.; Philip E. Hansen, Esq.; Victor A. Cardona, Esq.

(57) ABSTRACT

The device comprises filtration means and pumping means each housed in a compact unit mounted with the panels of a swimming pool basin. The unit includes a compartment (A) housing the filtration means in communication with the water of the basin, and a compartment (B) out of the water which contains the pumping means. The unit includes in the filtration compartment an assembly having first and second 90° elbows for intaking water from the basin. One of the elbows has arrangements for coupling to the bottom of the member containing the filtration means, while the other elbow has arrangements for coupling with a straight element. The unit also includes in the pumping compartment third and fourth 90° elbows for the intake of water. One of the third and fourth elbows is coupled to a straight element, and the other elbow of the third and fourth elbows is connected to a delivery side of the pumping means. Also included in the pumping compartment are fourth and fifth elbows for delivering water to the basin. One of the fourth and fifth elbows is coupled to a straight element, while the other elbow of the fourth and fifth elbows is connected to the delivery side of the pump. Further included in the filtration compartment for delivering the water is an elbowed assembly exhibiting a recess which can be shut off by a solid element or by an element exhibiting arrangements for coupling to a lateral delivery nozzle.

10 Claims, 10 Drawing Sheets

SYSTEM OF PIPEWORK FOR A DEVICE FOR FILTERING AND PUMPING THE WATER OF A SWIMMING POOL BASING

Cross Reference to Related Applications

This application is a continuation of copending PCT application PCT/FR00/02641, filed on Sep. 25, 2000, designating the United States and claiming priority from French application 99.12856, filed Oct. 11, 1999. The priorities of both applications are claimed herein, and the entire disclosures of both are incorporated herein by reference.

The invention relates to the technical field of pipework for conveying water and intended for connecting filtration and pumping members in the devices for taking in and delivering swimming pool basin water.

More specifically, the invention relates to pipework intended to connect the filtration and pumping members mounted in compartments of a unit consisting either of an attached compact block intended to be mounted on panels that make up the swimming pool basin assembly, or directly a filter panel intended to be mounted and assembled in continuity with the other constituent panels of the swimming pool basin. In general, and regardless of the embodiment, the unit comprises an internal compartment immersed in the water and intended to contain the filtration members, and a compartment located out of the water of the swimming pool basin and intended to contain the pumping members.

Water from the swimming pool basin is essentially taken in to an inlet known as skimmer, passes across filtration members and is delivered into the swimming pool basin by frontal and/or lateral nozzles, depending, in particular, on the embodiment of the compact unit containing the filtration and pumping means. Both on the intake compartment side and on the pumping compartment side, the intake and delivery pipework consists of a number of elements of, typically, PVC piping in the form of straight sleeves or 90° elbows in particular. This system requires a very great many parts. Furthermore, the elbows and sleeves are assembled under conditions which are tricky when consideration is given to the angular orientation that these various elements have to be given. Thus, the operator has to preassemble the elements, identify the appropriate angular orientation, mark this angular orientation with a line of felt tip, for example, disassemble the elements again and then once again assemble them in the previously determined angular orientation. There is no standardization of products, which results in a very great many parts and therefore in a fitting and assembly time which is very long with risks of leakage.

This prior art can be illustrated by the teaching of Patent Application WO 96/12075.

The invention has set itself the objective of overcoming these drawbacks in a simple, reliable, effective and rational way.

The problem that the invention sets out to solve is that of simplifying and rationalizing the connection between the filtration and pumping means for treating swimming pool basin water, with the objective of lowering costs by reducing the number of parts needed and making assembly easier, eliminating any risk of error and leakage.

In order to solve such a problem, there has been designed and developed a system of pipework comprising:

on the same side as the filtration compartment, and for the intake:
an assembly made up of two 90° elbows which are assembled and angularly indexed, one of the elbows having arrangements for coupling to the bottom of the filter member, while the other elbow has arrangements for coupling with a straight element;
the straight element is coupled at its other end to a 90° elbow identical to the previous one, the said elbow collaborating with means capable of ensuring the sealed penetration of a dividing wall separating the compartments;

on the same side as the pumping compartment and for the intake, two 90° elbows which are assembled and angularly indexed and both identical to the other 90° elbows, one of the elbows being coupled to a straight element connected to means capable of ensuring the sealed penetration of the dividing wall, the other elbow being connected to the delivery side of the pump;

on the same side as the pumping compartment and for the delivery, two 90° elbows which are assembled and angularly indexed and identical, one of the elbows being coupled to a straight element connected to means capable of ensuring the sealed penetration of the dividing wall, the other elbow being connected to the delivery side of the pump;

on the same side as the filtration compartment and for delivery, an elbowed assembly exhibiting a recess which can be shut off at will either by a solid element or by an element exhibiting arrangements for coupling to a lateral delivery nozzle, one of the ends of the said assembly exhibiting arrangements for coupling with means for the sealed penetration of the wall, while the other end exhibits arrangements for coupling to a frontal delivery nozzle.

In order to solve the problem of making a connection with a filter member and in the region of the intake, the arrangements for coupling the assembly to the bottom of the filter member consist of a thrust plate with a recess formed near one of the ends of one of the elbows, so that the said end protrudes from the plate to allow for the centring of a cylindrical well containing the filtration means and the bottom of which rests on the said plate via a compression seal.

In order to solve the problem of delivering the water in the intake compartment, the ends of the elbowed assembly are parallel and offset from one another, being connected by a straight transverse element.

Another problem that the invention sets out to solve is how to use, for delivering the water, the same basic element so as to keep the design of the unit compact, either in the form of an attached block, or in the form of a panel which can be incorporated into the adjacent panels of the swimming pool basin.

In order to solve such a problem:
the recess of the elbowed assembly is formed in the region of the straight element and of its rounded zones for connection with the ends, the said recess delimiting a shell of semicircular cross section;
the element for shutting off the recess consists of a shell of complementing and semicircular cross section;
the element for shutting off the recess consists of a shell of complementing and semicircular cross section in communication with a circular sleeve formed as a protrusion from its generatrices and the free end of which has arrangements for coupling to the lateral delivery nozzle;
the shell is secured to the recess in a sealed manner.

In order to solve the set problem of how to assemble the various constituent elements of the system of pipework in preestablished angular orientations, the angular indexing means consist of internal studs formed at the ends of the elbows and/or elements and capable of collaborating with complementing internal notches formed at the ends of the elements and/or elbows.

The invention is set out hereinbelow in greater detail with the aid of the figures of the appended drawings, in which:

FIG. 1 illustrates, by way of indicative non-limiting example, a compact swimming pool basin filtration unit.

Figure 1:
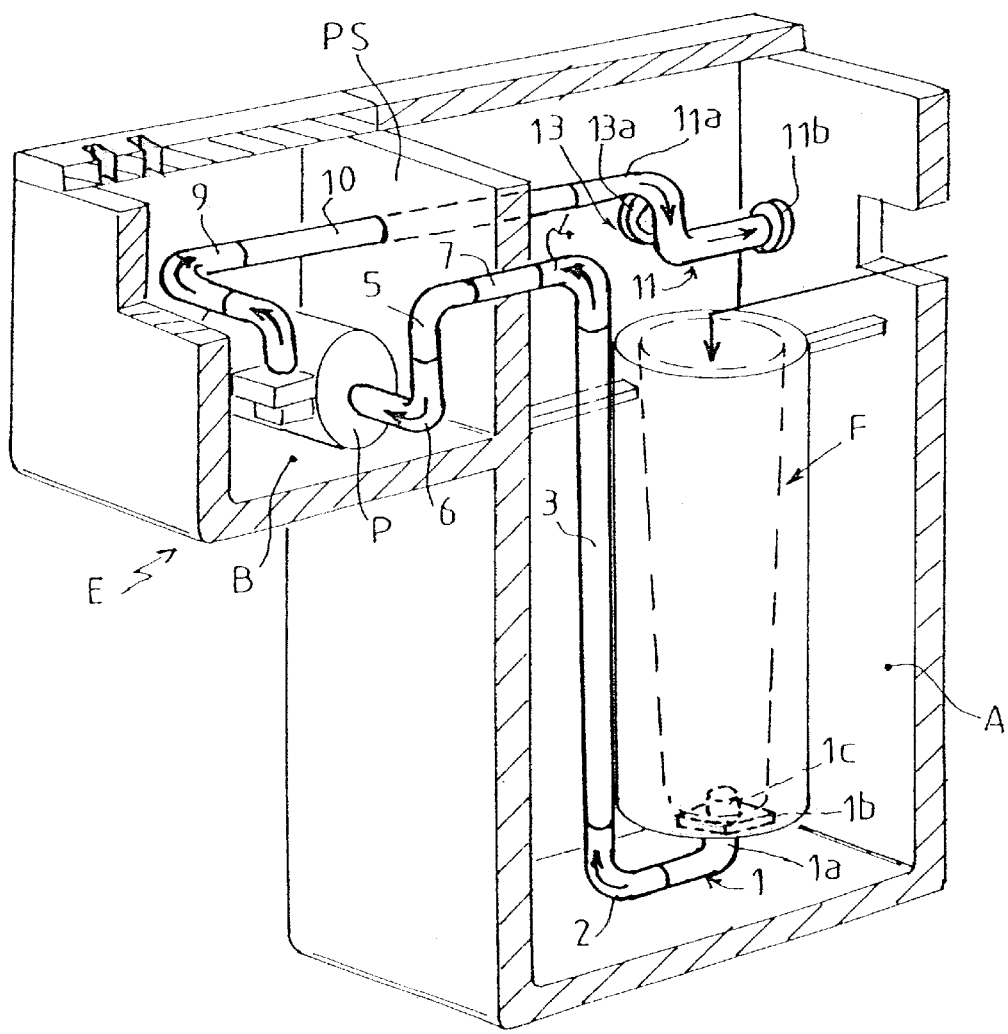
FIG. 1 is a view in part section, of diagrammatic nature, showing an intake assembly for a swimming pool basin and the principle of the system of pipework.
Figure 2:
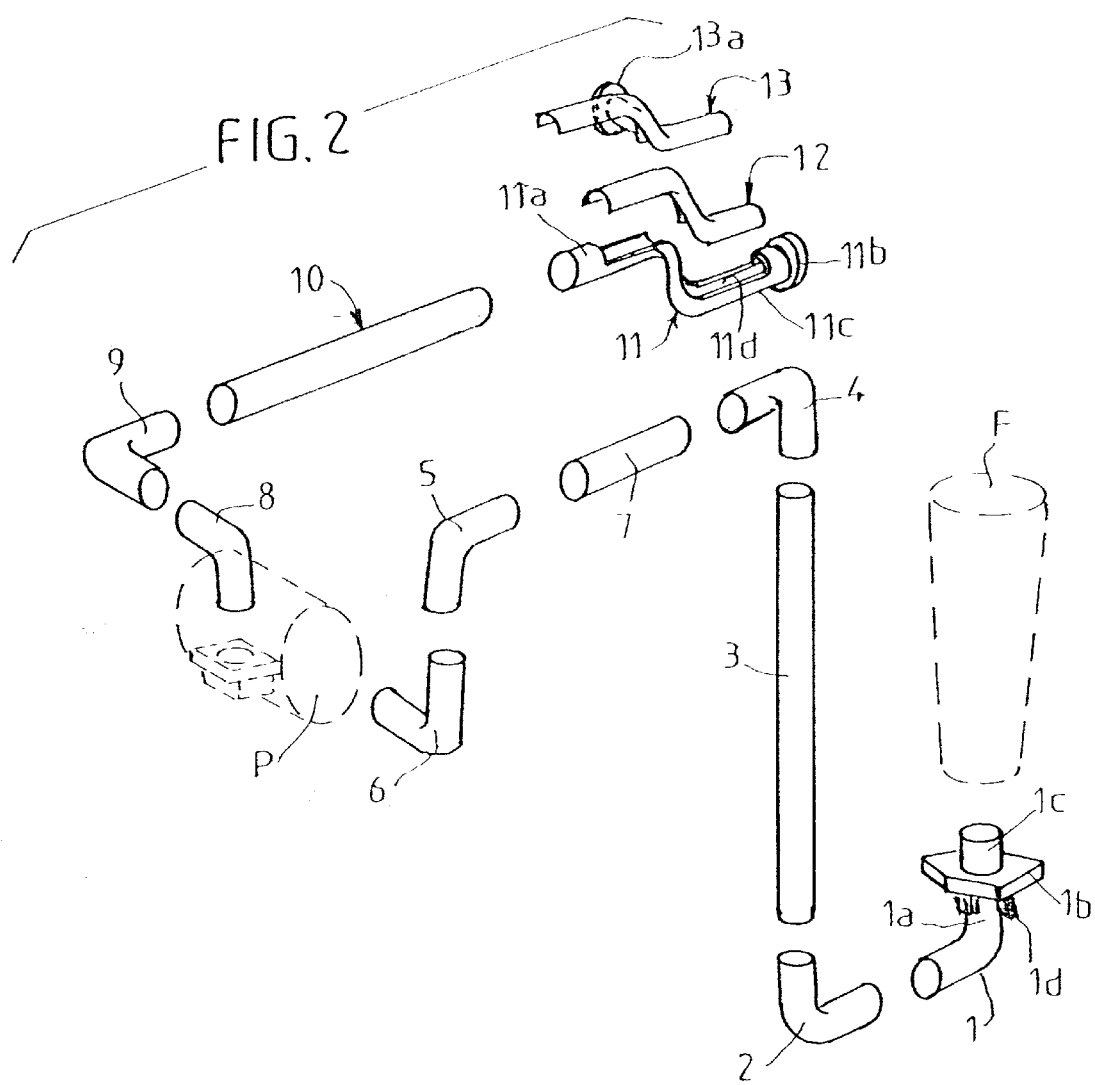
FIG. 2 is a perspective view showing the main elements of the system of pipework.
Figure 3:
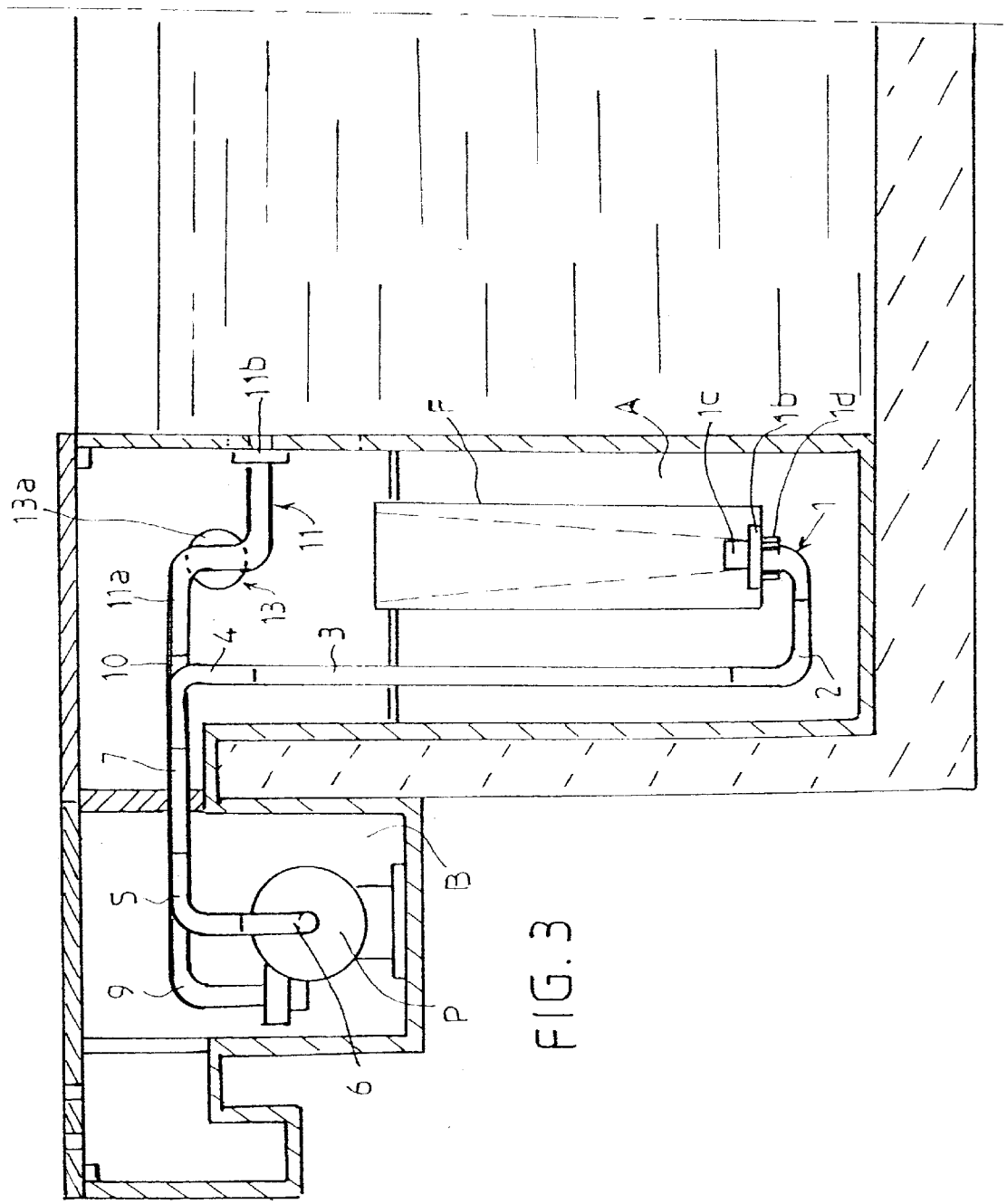
FIG. 3 is the view in longitudinal section showing a swimming pool filtration assembly equipped with the system of pipework according to the invention.
Figure 4:
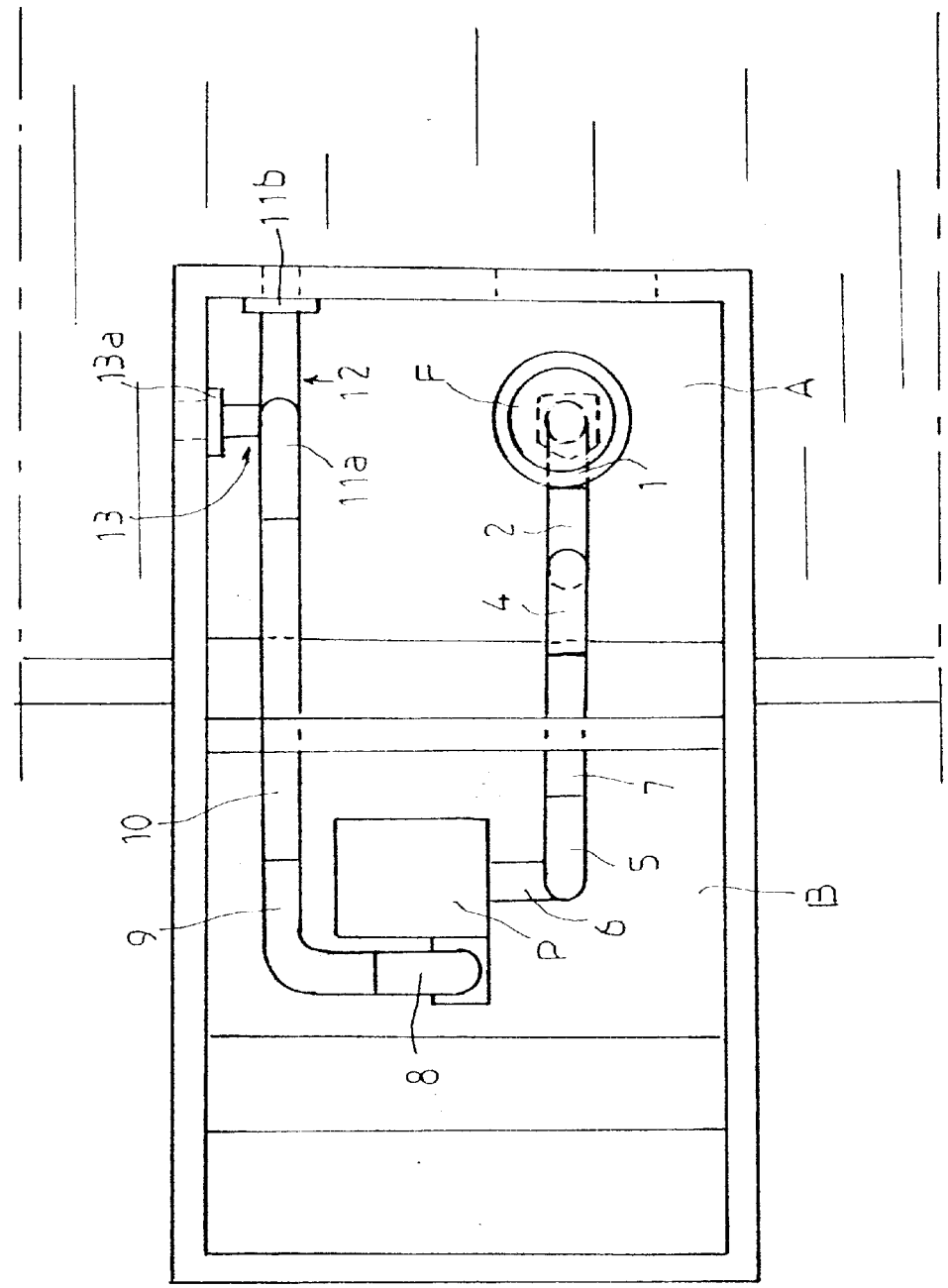
FIG. 4 is a plan view in section corresponding to FIG. 3.
Figure 5:
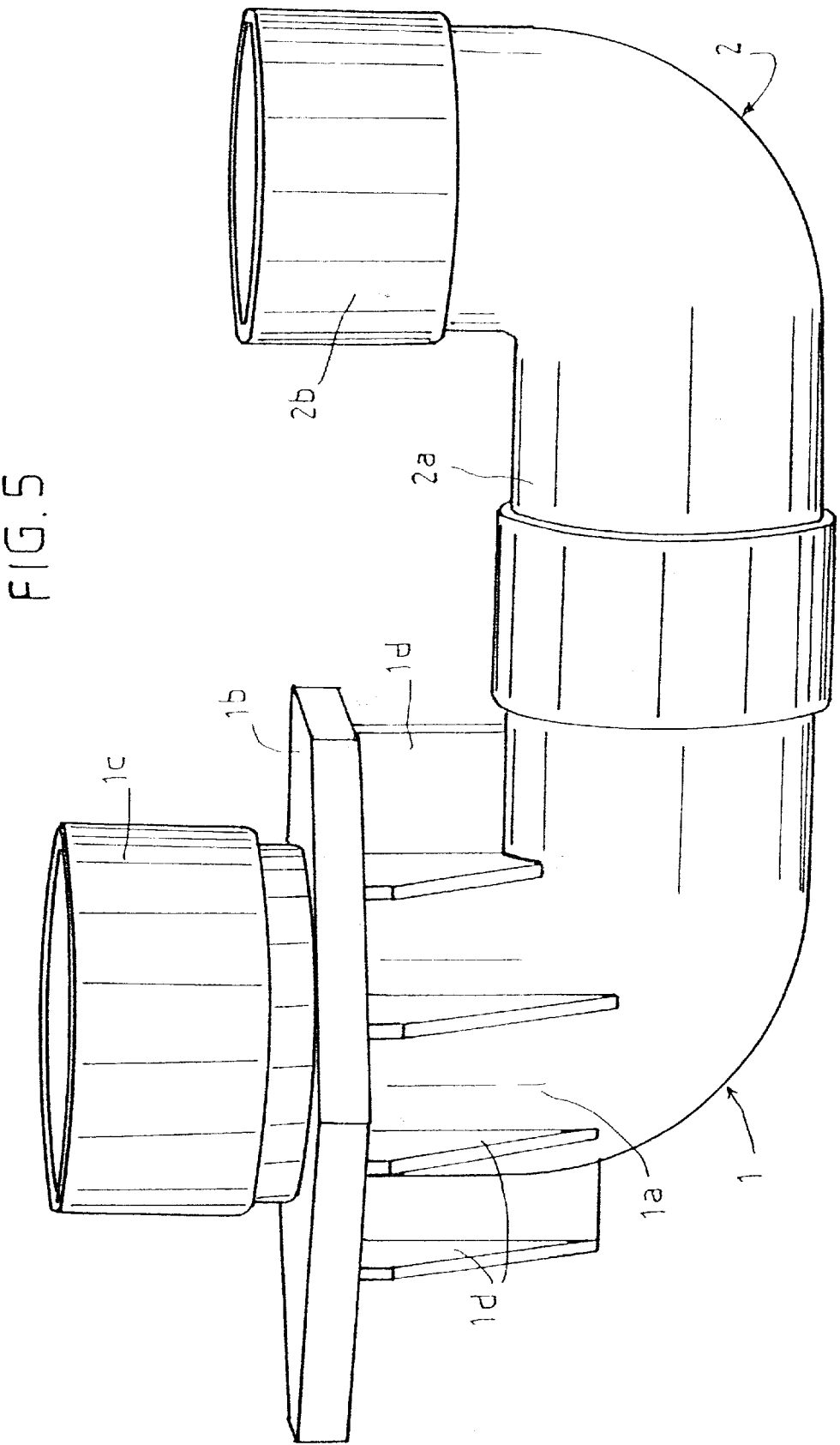
FIG. 5 is perspective view showing the assembly for coupling to the bottom of the filtration member.
Figure 6:
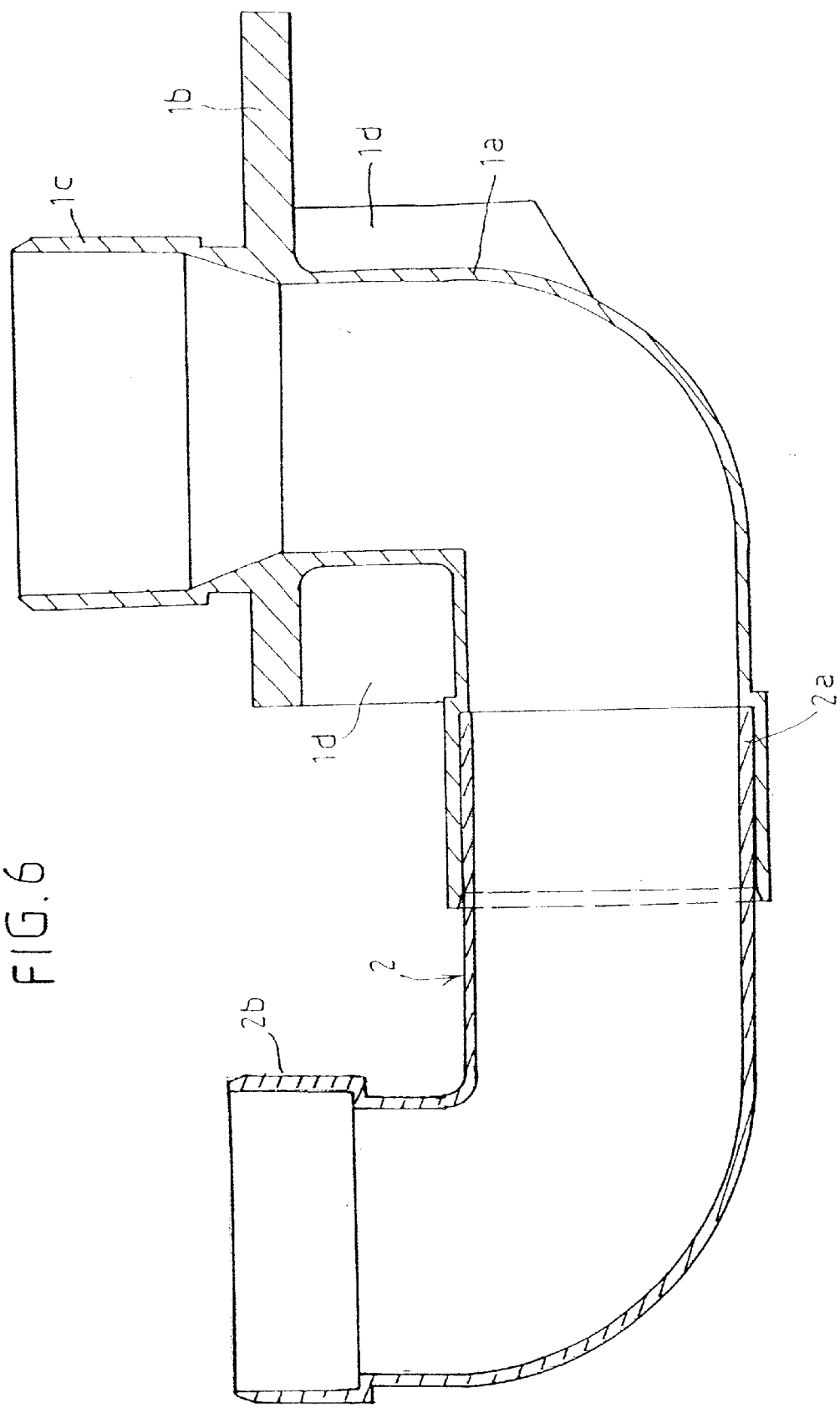
FIG. 6 is view in longitudinal section of the assembly illustrated in FIG. 4.
Figure 7:
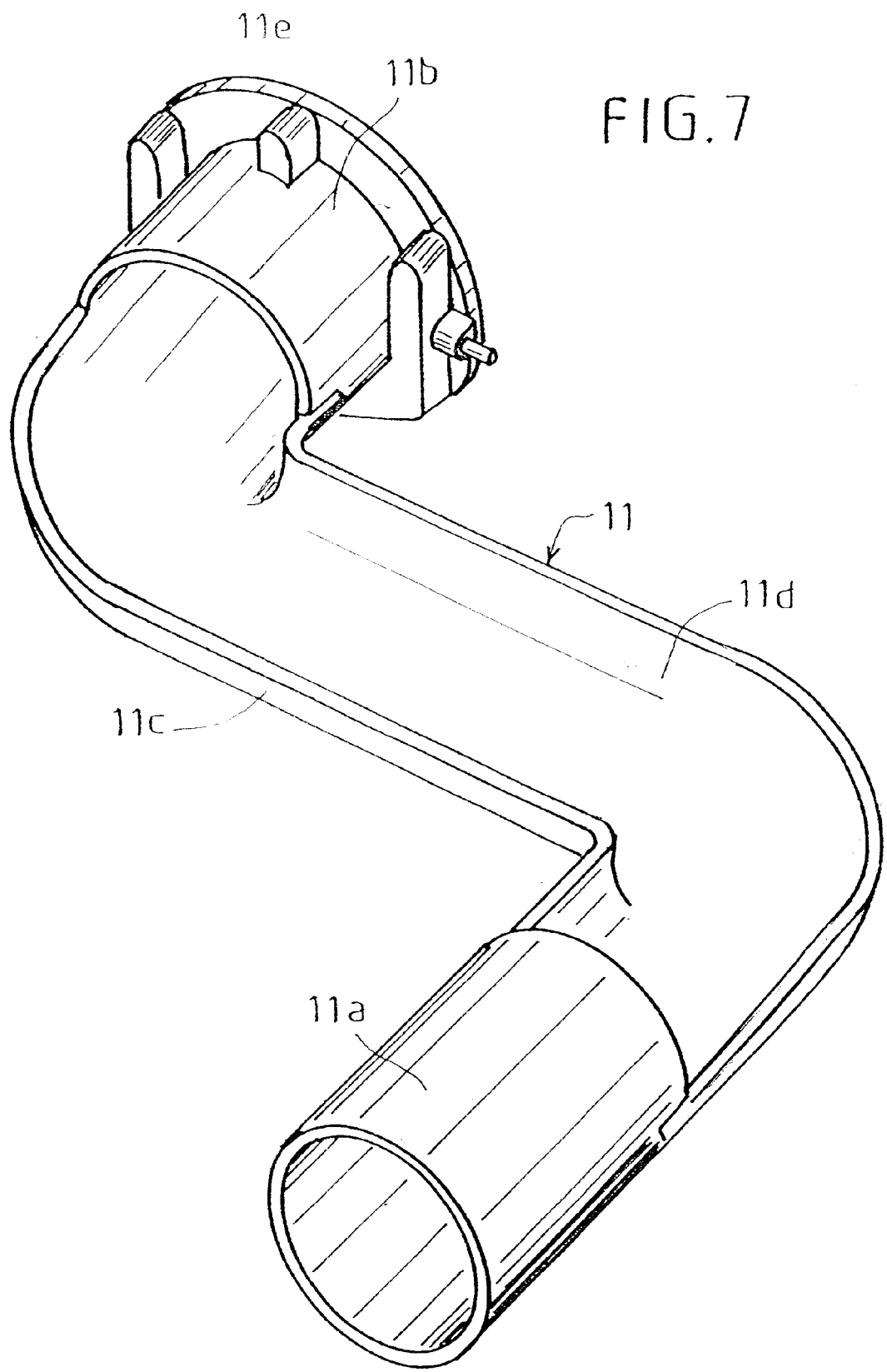
FIG. 7 is a perspective view of the elbowed assembly for delivering water and prior to the fitting of the element that blanks off the recess.
Figure 8:
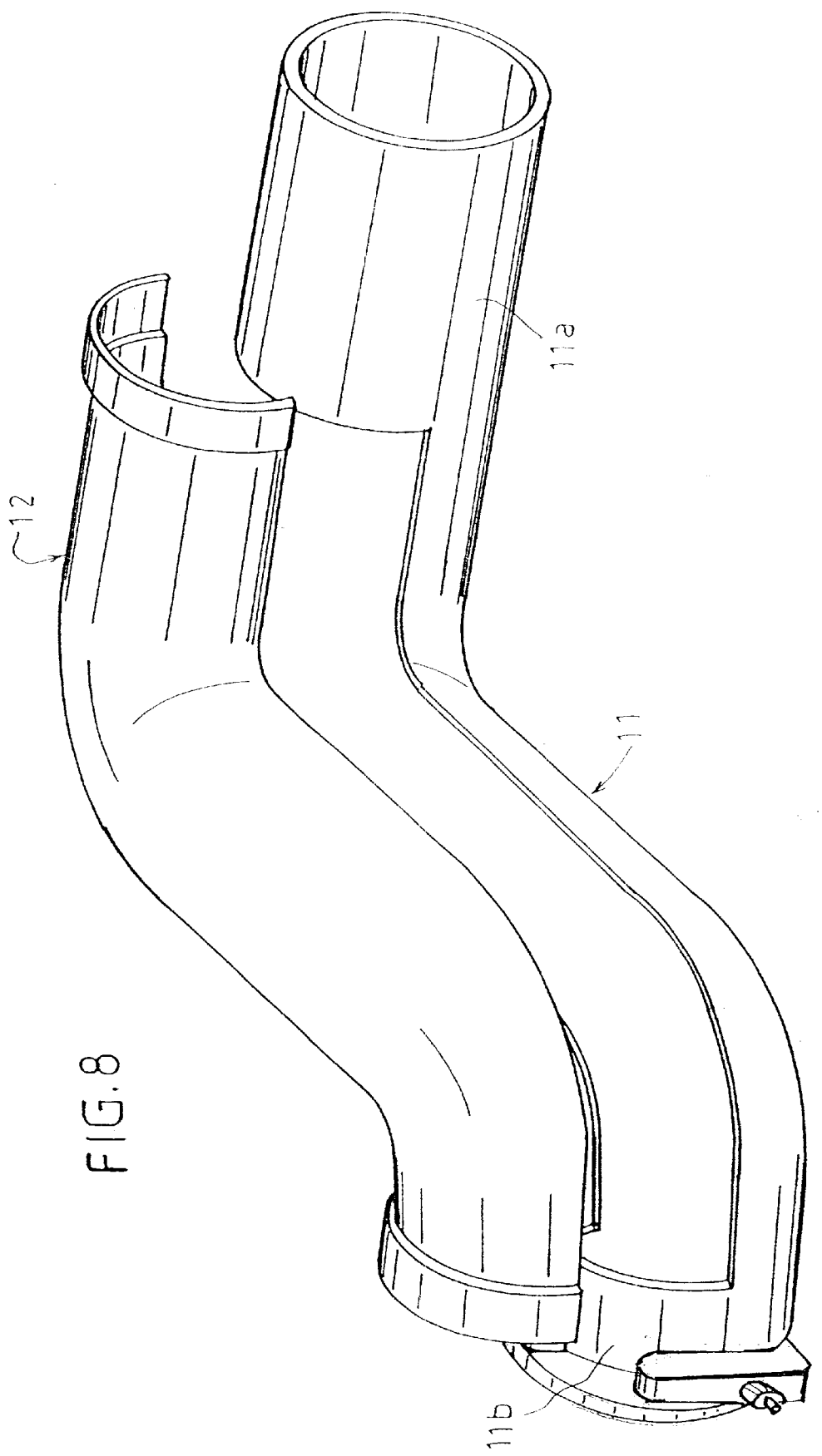
FIG. 8 is a perspective view corresponding to FIG. 7 after the fitting of the shutting-off element, in the case where the latter consists of a simple shell of complementing semicircular cross section.
Figure 9:
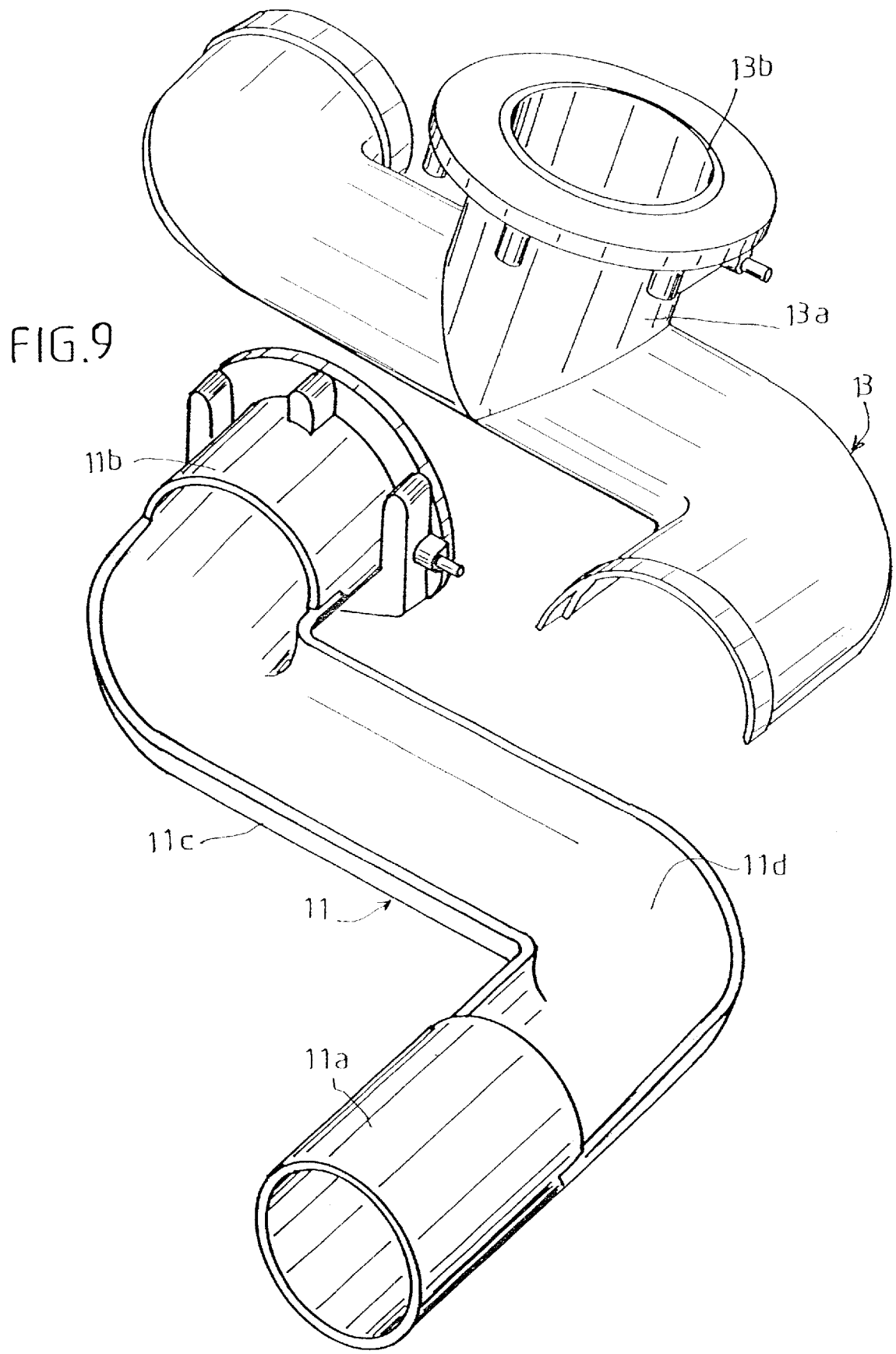
FIG. 9 is a perspective view corresponding to FIG. 7 in the case where the shutting-off element consists of a shell of complementing semicircular cross section equipped with an arrangement for mounting a lateral delivery nozzle.

This unit (E) comprises a compartment (A) immersed in the water and containing filtration means (F). The unit (E) comprises another compartment (B) located outside the swimming pool basin and containing the pumping means (P). In a perfectly known manner, the unit (E) may constitute a compact block mounted astride the panels or the like that make up the swimming pool basin. Alternatively, this unit (E) may constitute a filter panel exhibiting arrangements for assembling it and mounting it in juxtaposition with the adjacent panels that make up the swimming pool basin. The filtration means (F) consist of a filter cartridge or bag mounted removably in a bowl or well consisting of a cylindrical sleeve mounted vertically in the compartment (A) to receive water from the swimming pool basin via an inlet known as a skimmer. The pumping members (P) consist of at least one single-speed or twin-speed pump.

The system of pipework can be broken down into four zones:
an intake zone located in the filtration compartment (A),
an intake zone located in the pumping compartment (B),
a delivery zone located in the pumping compartment (B),
a delivery zone located in the filtration compartment (A).

The intake zone located on the filtration compartment side comprises an assembly made up of two 90° elbows (1) and (2) which are assembled and angularly indexed. One of the elbows (1) exhibits arrangements for coupling to the bottom of the filter member, particularly the bottom of a vertical well containing the filtration element proper.

For example, one of the branches (1a) of the elbow (1) has, very roughly at mid-height, a horizontal thrust plate (1b). This means that the end (1c) of the elbow (1) which protrudes from the plate (1b) constitutes a centring sleeve collaborating with an complementing opening formed in the bottom of the well containing the filtration element proper. The bottom of the well rests on the plate (1b) via a seal, thus allowing the well assembly containing the filtration member to be raised slightly with respect to the sleeve (1c) in case the pump should lose its prime in order to guarantee a minimum supply of water to prevent the pump from running dry, thus sparing the mechanical seals.

Advantageously, the assembly of the elbow (1) with the thrust plate (1b) is obtained by injection-moulding of plastic. The plate (1b) is connected to the body of the elbow (1) by vertical stiffening fins (1d).

As mentioned, the two elbows (1 and 2) are assembled and angularly indexed. The indexing means consist of internal studs formed peripherally at the tip of the end of the branch (1b) of the elbow. These studs are intended to collaborate with complementing notches formed at the end of the branch (2a) of the elbow (2). For example, the studs and the notches are distributed uniformly around the circumference, offset by 90°. The other branch (2b) of the elbow (2) is intended to be coupled with the straight element (3). The other end of the straight element of (3), the opposite end to its end which is coupled to the 90° elbow (2), is coupled to another 90° elbow (4) identical to the said elbow (2). This elbow (4) collaborates with means capable of ensuring the sealed penetration of a dividing wall (PS) separating the compartments (A and B). The elbows (1) and (2), the straight element and the elbow (4) are fixed in the desired angular position by bonding, in particular.

The intake zone located in the pumping compartment comprises two 90° elbows (5) and (6) both identical to the elbows (2) and (4) coupled to the straight element (3). The two elbows (5) and (6) are assembled and angularly indexed so as to be oriented in two different planes. The elbow (5) is coupled to a straight element (7) for connection to the means capable of ensuring the sealed penetration of the dividing wall (PS). The other elbow (6) is connected to the intake of the pump (P) by any known and suitable means.

Given these arrangements, the outcome is that, as far as the intake is concerned, the system of pipework comprises just four identical 90° elbows (2, 4, 5, 6), one 90° elbow (1) exhibiting, moulded into it, the means of coupling to the filtration members, and two straight elements (3 and 7) which can be cut to the desired length. The sleeve (7) is intended to be coupled to the means for the sealed penetration of the wall.

In the delivery zone located on the pumping compartment side, the system of pipework comprises two identical 90° elbows (8) and (9) which are assembled and angularly indexed. These two elbows (8) and (9) are greater in length and diameter than the other 90° elbows (2, 4, 5 and 6). The free end of the elbow (8) is coupled by any known and suitable means to the delivery of the pump (P). The free end of the other elbow (9) is coupled to a straight element (10) for the sealed penetration of the dividing wall (PS). Quite obviously, the orientation and angular indexing of the elbows (8 and 9) depends on the position of the pump and of the location of the sealed penetration of the dividing wall.

In the delivery zone located in the filtration compartment, the system of pipework comprises an elbowed assembly (11) exhibiting two roughly parallel ends (11a) and (11b). The two ends (11a) and (11b) are offset and connected by a transverse branch (11c) so as to constitute an elbowed assembly in a very approximate S shape. The free end of the part (11a) exhibits arrangements for coupling to the means of sealed penetration of the dividing wall (PS). The free end of the part (11b) exhibits arrangements (11e) for coupling to a frontal delivery nozzle.

According to an important feature, the elbowed assembly (11) exhibits a recess (11d) which can be shut off either by a solid element (12) or by an element (13) exhibiting arrangements (13b) for coupling with a lateral delivery nozzle. The elbowed assembly (11) and the shutting-off elements (12) or (13) are obtained by injection-moulding of a plastic.

The recess (11d) is formed in the region of the straight element (11c) and of the rounded zones of connection with the ends (11a) and (11b) of the element (11c), the said recess (11d) delimiting a shell of semicircular cross section.

The shutting-off element (12) consists of a shell of complementing and semicircular cross section. This elements (12) is used when it is necessary to have just a frontal delivery nozzle. This is the case when the compact filtration unit constitutes a panel per se.

The element (13), just like the element (12), consists of a shell of complementing semicircular cross section in communication with a circular sleeve (13a) formed at right angles and as a protrusion from its generatrices and the free end of which has the arrangements (13b) for coupling with the lateral delivery zone. In this embodiment, the elbowed assembly therefore exhibits arrangements for a frontal delivery and a lateral delivery. The benefit of these two nozzles lies in the case where the filtration unit constitutes a compact block attached and mounted astride the walls or panels constituting the swimming pool basin.

Figure 10:
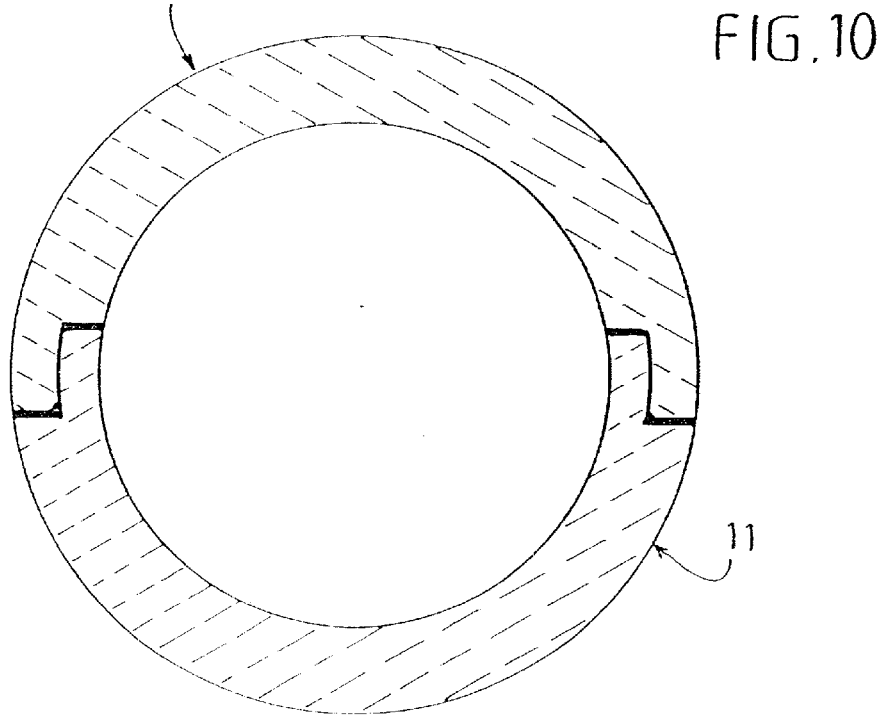
FIGS. 10 and 11 are, on a larger scale, views in section of examples for assembling the shutting-off element.
Figure 11:
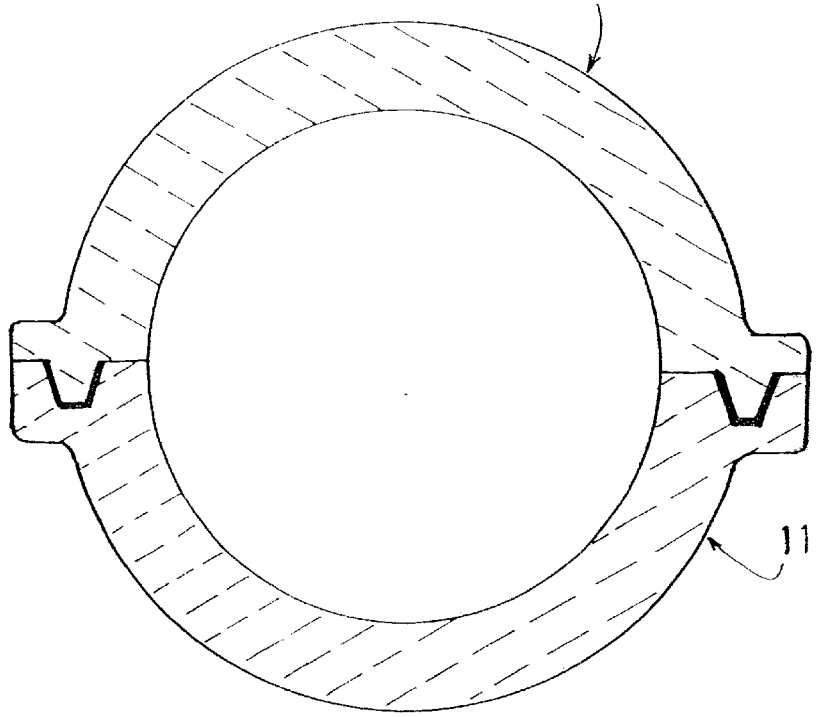

The elements (12) and (13) are advantageously assembled on the elbowed assembly (11) by bonding. Likewise, the elbowed assembly (11) and the shutting-off elements (12) and (13) may exhibit complementing indexing arrangements. Reference is made again to FIGS. 10 and 11 which show illustrative and non-limiting examples of the sealed assembly. The diameters of the various elements that make up the system of pipework according to the features of the invention are appropriately determined according to the flowrate of water to be treated and the characteristics of the one or more pumping means.

The advantages are clearly apparent from the description, and the following are recalled and emphasized in particular:
- the standarization of elements;
- the reduction of the number of elements needed for the entire installation, making it possible to substantially reduce costs;
- the ease of assembly without the need for special training, given the indexing means exhibited by the various elements;
- the speed of installation;
- the quality of the results obtained.

What is claimed is:

1. System of pipework for a device for filtering and pumping water for a swimming pool basin, said system comprising filtration means and pumping means housed in a compact unit mounted with panels of the swimming pool basin, said unit comprising a filtration compartment (A) housing the filtration means in communication with the water of the basin, a pump compartment (B) out of the water and containing the pumping means, wherein said unit comprises:

an assembly configured to intake water from the pool basin, said assembly located in the filtration compartment and said assembly being made up of a first 90° elbow and a second 90° elbow which are assembled and angularly indexed, wherein said first elbow is configured to coupled to the bottom of a member containing the filtration means, while the second elbow (2) is configured to couple with a first end of a straight element (3);

a second of the straight element (3) is coupled to a third 90° elbow (4) indentical to said second elbow (2), said third elbow (4) collaborating with means for ensuring sealed penetration of a dividing wall separating said pump compartments and said filtration compartment;

a fourth 90° elbow in the pumping compartment (B) and configured to intake water from the pool basin, said fourth 90° elbow and said fifth 90° elbow being assembled and angularly indexed and identical to said third 90° elbow and said second 90° elbow, one of said fourth elbow and said fifth elbow being coupled to a second straight element (7) connected to said means for of ensuring sealed penetration of the dividing wall, the other elbow of said fourth 90° elbow and said fifth 90° elbow (6) being connected to a pump intake of said pumping means;

a sixth 90° elbow and a seventh 90° elbow in the pumping compartment (B) and configured to deliver water to the pool basin, said sixth 90° elbow and said seventh 90° elbow assembled and angularly indexed and indentical to each other, one of said sixth 90° elbow and said seventh 90° elbow being coupled to a third straight element (10) connected to means for ensuring a second sealed penetration of the dividing wall, the other elbow (8) of said sixth 90° elbow and said seventh 90° elbow being connected to a delivery side of the pumping means;

an elbowed assembly (11) configured to deliver water to the pool basin, said elbowed assembly located in said filtration compartment and said elbowed assembly exhibiting a recess (11d) which can be shut off by a solid element (12) or by an element (13) configured for coupling to a lateral delivery nozzle, one of the ends of said assembly exhibiting arrangements for coupling with said means for the second sealed penetration of the wall while the other end exhibits arrangements (11c) for coupling to a frontal delivery nozzle.

2. System of pipework according to claim 1, characterized in that the arrangements for coupling the assembly (1–2) to the bottom of the member containing the filtration means, consist of a thrust plate (1b) with a recess formed near one of the ends of one of the elbows (1), so that the said end protrudes from the plate (1b) to allow for the centring of a cylindrical well containing the filtration means and the bottom of which rests on the said plate via a compression seal.

3. System of pipework according to claim 1, characterized in that the ends (11a) and (11b) of the elbowed assembly (11) are parallel and offset from one another, being connected by a straight transverse element (11c).

4. System of pipework according to claim 1, characterized in that the recess (11d) of the elbowed assembly (11) is formed in the region of the straight element (11c) and of its rounded zones for connection with the ends (11a and 11b), the said recess (11d) delimiting a shell of semicircular cross section.

5. System of pipework according to claim 4, characterized in that the element for shutting off the recess (11d) consists of a shell (12) of complementing and semicircular cross section.

6. System of pipework according to claim 5, characterized in that said solid element and said element for coupling to a lateral delivery nozzle are secured to the recess (11d) in a sealed manner.

7. System of pipework according to claim 4, characterized in that the element for shutting off the recess (11d) consists of a shell (13) of complementing and semicircular cross section in communication with a circular sleeve (13a) formed as a protrusion from its generatrices and the free end of which has arrangements for coupling to the lateral delivery nozzle.

8. System of pipework according to claim 7, characterized in that said solid element and said element for coupling to a lateral delivery nozzle are secured to the recess (11d) in a sealed manner.

9. System of pipework according to claim 1, comprising an angular indexing means having internal studs formed at ends of at least one of said first elbow, said second elbow, said third elbow, said fourth elbow, said fifth elbow, said sixth elbow, and seventh elbow, said first straight element, said second straight element, said third straight element, said solid element, and said element configured for coupling to the lateral delivery nozzle, said studs capable of collaborating with complementing internal notches formed at the ends of said at least one of said first elbow, said second elbow, said third elbow, said fourth elbow, said fifth elbow, said sixth elbow, said seventh elbow, said first straight element, said second straight element, said third straight element, said solid element, and said element configured for coupling to the lateral delivery nozzle.

10. System of pipework according to claim 1, characterized in that the elbowed assembly (11) and said solid element and said element for coupling to lateral delivery nozzle are formed by injection-moulding of a plastic.

* * * * *

UNITED STATES PATENT AND TRADEMARK OFFICE
CERTIFICATE OF CORRECTION

PATENT NO. : 6,503,391 B1
DATED : January 7, 2003
INVENTOR(S) : Desjoyaux et al.

It is certified that error appears in the above-identified patent and that said Letters Patent is hereby corrected as shown below:

<u>Title page, Item [54] and Column 1, line 3,</u>
Delete the word "BASING" at the end of the title and insert -- BASIN --

<u>Column 6,</u>
Line 1, insert the word -- end -- after the word "second"
Line 13, delete the word "of" at the beginning of the sentence
Line 20, insert the word -- being -- after the word "elbow"
Line 6, delete "(11c)" and insert -- (11e) --
Line 43, delete the word "centring" and insert -- centering --

Signed and Sealed this

Tenth Day of June, 2003

JAMES E. ROGAN
*Director of the United States Patent and Trademark Office*